United States Patent [19]

Cha et al.

[11] Patent Number: 5,677,808
[45] Date of Patent: Oct. 14, 1997

[54] SYSTEM AND METHOD FOR CONTROLLING A SEEK OPERATION IN A DISK DRIVE

[75] Inventors: Ellis Taeho Cha, Santa Clara; Jia-Kuen Jerry Lee, San Jose, both of Calif.

[73] Assignee: Conner Peripherals, Inc., San Jose, Calif.

[21] Appl. No.: 359,106

[22] Filed: Dec. 19, 1994

[51] Int. Cl.$^6$ .................................................. G11B 5/596
[52] U.S. Cl. ............................ 360/78.07; 360/78.04
[58] Field of Search .......................... 360/78.07, 78.06, 360/78.04, 75

[56] References Cited

U.S. PATENT DOCUMENTS 4,908,561  3/1990  Hashimoto ..................... 360/78.07 X

FOREIGN PATENT DOCUMENTS 1-279473  11/1989  Japan .................... 360/78.07
4-358368  12/1992  Japan .................... 360/78.07

Primary Examiner—Andrew L. Sniezek
Attorney, Agent, or Firm—Flehr Hohbach Test Albritton & Herbert LLP

[57] ABSTRACT

A disk drive, comprising a storage medium having data tracks for storing data, a spindle motor mounting the storage medium for rotation, an interactive element for reading information from and writing information on the data tracks of the storage medium and an actuator responsive to control signals, mounting the interactive element for motion to selectively position the interactive element relative to preselected data tracks of the storage medium and to move the interactive element from a first data track to a second data track in response to the control signals. The interactive element is arranged and configured to fly above the storage medium. Moreover, control electronics are coupled to the actuator for generating the control signals to cause the actuator to move the interactive element from the first data track to the second data track. The control signals include velocity control signals generated as a function of the number of data tracks to be crossed from the first data track to the second data track, and the location of the first data track relative to the second data track. The velocity control signals control the actuator to move at preselected velocities, including a maximum velocity.

8 Claims, 5 Drawing Sheets

Minimum Flying Height Allowed = 1.8u"       NL = No Limiting Velocity

| Starting Zone Radius(") | Destination Zone Radius(") | | | | | | | | |
|---|---|---|---|---|---|---|---|---|---|
| | 0.68 | 0.825 | 0.944 | 1.072 | 1.202 | 1.372 | 1.577 | 1.75 | 1.805 |
| 0.66 | | NL | 70 | 70 | 101 | 95 | 83 | 66 | 66 |
| 0.825 | NL | | 101 | 101 | 95 | 95 | 83 | 66 | 66 |
| 0.944 | NL | NL | | 101 | 95 | 83 | 83 | 66 | 66 |
| 1.072 | NL | NL | NL | | 95 | 83 | 66 | 66 | 66 |
| 1.202 | NL | NL | NL | NL | | NL | NL | NL | NL |
| 1.372 | NL | NL | NL | NL | NL | | NL | NL | NL |
| 1.577 | NL | NL | NL | NL | NL | NL | | NL | NL |

FIG. 6

SYSTEM AND METHOD FOR CONTROLLING A SEEK OPERATION IN A DISK DRIVE

FIELD OF THE INVENTION

The present invention is directed to disk drives. More particularly, the present invention provides a system and method for controlling the velocity of a transducer in a disk drive during a seek operation such that the average velocities generally attainable by the transducer during seeks are higher than in present disk drive products without encountering the deleterious effects of fly height drop that may occur during the seek.

BACKGROUND OF THE INVENTION

Disk drives are commonly used in workstations, personal computers, laptops and other computer systems to store large amounts of data that are readily available to a user. In general, a disk drive comprises a magnetic disk that is rotated by a spindle motor. The surface of the disk is divided into a series of data tracks that extend circumferentially around the disk. Each data track can store data in the form of magnetic transitions on the disk surface.

An interactive element, such as a magnetic transducer, is used to sense the magnetic transitions to read data, or to generate an electric current that causes a magnetic transition On the disk surface, to write data. The magnetic transducer is mounted by a rotary actuator and is selectively positioned by the actuator over a preselected data track of the disk to either read data from or write data to the preselected data track of the disk, as the disk rotates below the transducer.

In modern disk drives, a relatively rigid or hard disk is used as the magnetic medium. The magnetic transducer is mounted within a head structure having an air bearing surface that causes the transducer to fly above the data tracks of the disk surface due to fluid currents caused by rotation of the disk. Thus, the transducer does not physically contact the disk surface during normal operation of the disk drive. The amount of distance that the transducer flies above the disk surface is referred to as the "fly height." One advantageous type of head structure that operates at a fly height over the disk surface is a Transverse Pressure Contour (TPC) head. Current disk drive designs using a TPC head seek to limit the fly height to approximately 2 µ inches above the disk surface. Any contact between the head and the disk surface may result in damage to the disk or head. Accordingly, it is important to maintain an adequate fly height whenever the actuator positions the transducer over data tracks while the disk is rotating.

A seek operation relates to the radial movement of the magnetic transducer by the actuator from a current data track to a preselected destination data track that contains, e.g., a data file that the computer wants to read data from or write data to. The actual path followed by the transducer is generally arcuate in shape when a rotary actuator is used. The amount of time it takes the disk drive to move the actuator radially from the current data track to the destination data track is a very important operating characteristic of the disk drive since it directly impacts the overall access time relevant to user data availability.

It has been observed that during a seek in a direction from an inner diameter of the disk to an outer diameter, the fly height of the transducer, particularly a transducer mounted in a TPC head, decreases as a function of the velocity of the transducer across the disk surface. It is believed that the fly height decrease is caused by both the inertial force due to seek acceleration and the varying degree of skew between the magnetic transducer and the surface of the disk as the actuator moves the transducer radially along the arcuate path from the inner radius toward the outer radius.

Typically, during the design of a disk drive, an optimum acceleration curve is determined for moving a transducer from, e.g., the inner diameter of the disk to the outer diameter, in a minimum amount of time, while maintaining an adequate fly height for the transducer. The acceleration curve is stored in the disk drive and is referred to during each particular seek operation to calculate a velocity profile for controlling the velocity of the transducer during the seek operation. Each velocity profile is calculated as a function of the number of tracks that must be traversed by the transducer, to go from the current data track to the destination data track.

The velocity profile provides optimum velocity values over time for the transducer, to accelerate the transducer to a maximum velocity and then decelerate the transducer to zero velocity upon arrival at the destination track. The velocity values are calculated based upon the stored acceleration curve, to achieve as fast a travel time as possible in view of the number of tracks that must be crossed during the seek. The maximum velocity is limited for all seeks by the maximum velocity obtained when following the optimum acceleration curve.

At the present time, the acceleration curve is determined such that the maximum velocity reached in any seek operation is limited to a value at which the fly height of the transducer is always acceptably above the disk surface, regardless of the particular current and destination tracks of a particular seek operation. Accordingly, data access time is less than would be possible if fly height loss were not a factor in controlling transducer motion.

SUMMARY OF THE INVENTION

The present invention recognizes that the decrease in fly height during a seek operation is a function of both the velocity of the transducer and the radial positions of the current and destination tracks relative to the inner and outer diameters of the disk. More particularly, it has been discovered that fly height loss during a long seek, from a data track in the vicinity of the inner diameter to a destination data track in the vicinity of the outer diameter, is greatest at data tracks in the vicinity of the middle radius of the disk. Fly height loss decreases substantially at the inner and outer radii of the disk.

According to the present invention, each velocity profile is determined as a function of both the number of tracks to be crossed and, during a particular inner diameter to outer diameter seek, the radius of each of the current and destination tracks for that seek operation. A velocity profile is developed for each seek operation as a function of the number of track crossings and the start and end radii range of the particular seek. For example, if each of a current track and destination track is in the vicinity of the outer diameter of the disk, there is no limit placed on the maximum velocity due to fly height loss factors since the fly height loss during that seek is negligible. When the current and destination tracks are spaced from each other at opposite sides of the vicinity of the middle radius of the disk, the maximum velocity of the appropriate velocity profile would be limited, and set at a level appropriate to maintain adequate fly height throughout the seek.

When a seek operation is to be performed, the disk drive determines the number of tracks to be crossed and the radii of the current and destination tracks. The disk drive then calculates a velocity profile developed for the number of track crossings and the radii of the start and finish of the particular seek, and uses that velocity profile to control the velocity of the transducer during the seek. In this manner, when the total seek is, for example, outside certain regions adjacent the middle radius of the disk, maximum velocities can be increased above levels now used in conventional disk drives. Only during certain inner diameter to outer diameter seeks, is the maximum velocity limited to a value that provides an adequate fly height throughout the seek, particularly at the middle radii regions of the disk.

The use of the maximum velocity scheme according to the present invention results in overall average velocities that are higher than the average velocities presently used in seek operations, to thereby generally improve access time characteristics for a disk drive. In addition, when using a TPC head and the seek is in the direction from the outer diameter to the inner diameter of the disk, there is no limit placed on the maximum velocity because it has been observed that fly height increases during seeks in that direction for a TPC head.

BRIEF DESCRIPTION OF THE DRAWINGS

FIG. 6 is a chart showing maximum velocities for seek operations for various starting inner radii, each maximum velocity being relevant to a different destination radii.

DETAILED DESCRIPTION

Figure 1:
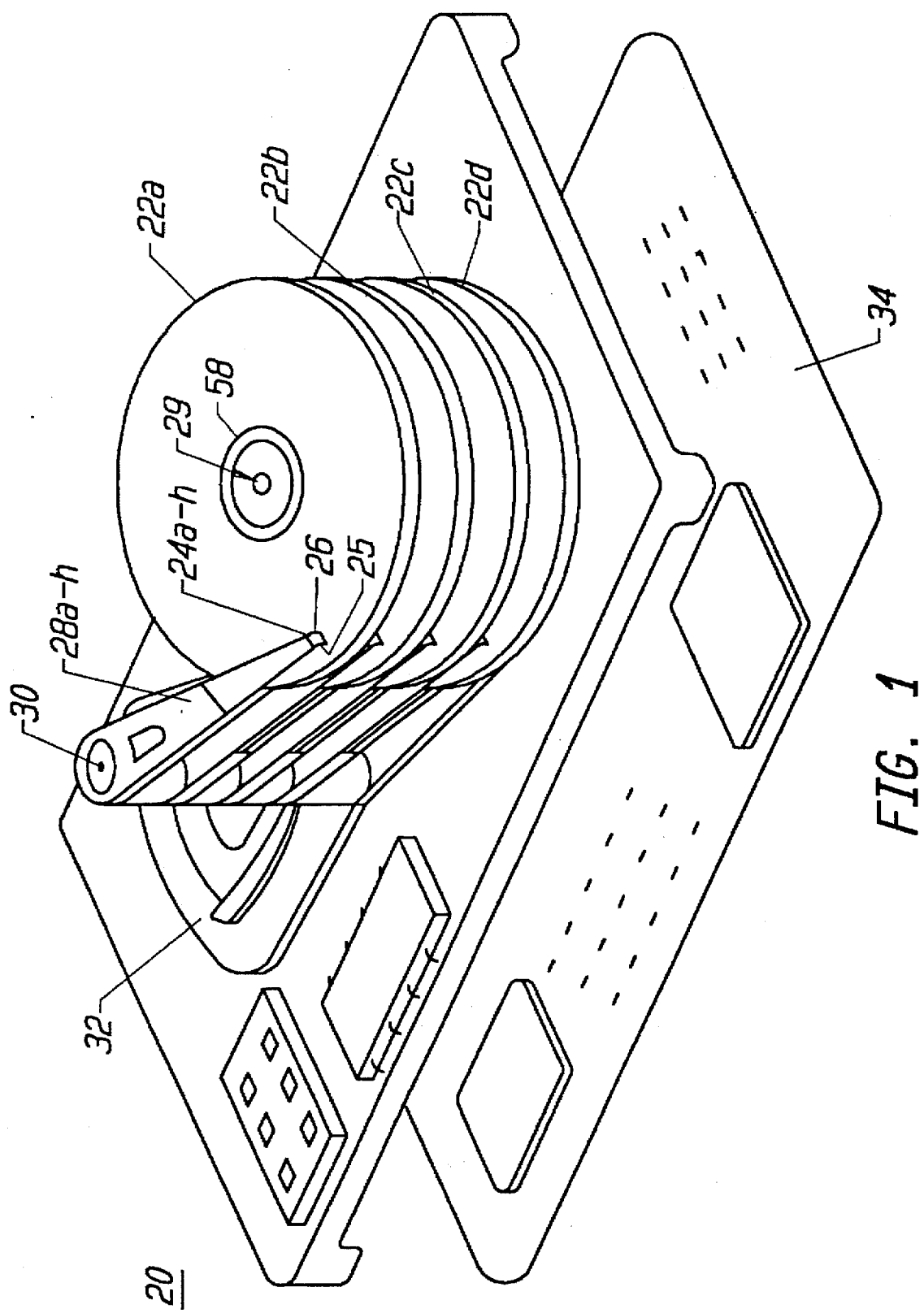
FIG. 1 is perspective view of a disk drive.

Referring now to the drawings, and initially to FIG. 1, there is illustrated a disk drive designated generally by the reference numeral 20. The disk drive includes a plurality of storage disks 22a–d and a plurality of read/write heads 24a–h. Each of the storage disks 22a–d is provided with a plurality of data tracks to store user data. As illustrated in FIG. 1, one head is provided for each surface of each of the disks 22a–d such that data can be read from or written to the data tracks of all of the storage disks. It should be understood that the disk drive 20 is merely representative of a disk drive system utilizing the present invention and that the present invention can be implemented in a disk drive system including more or less storage disks.

The storage disks 22a–d are mounted for rotation by a spindle motor arrangement 29, as is known in the art. Moreover, the read/write heads 24a–h are supported by respective actuator arms 28a–h for controlled positioning over preselected radii of the storage disks 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disk surfaces.

Each of the read/write heads comprises a magnetic transducer 25 mounted to a slider 26 having an air bearing surface. As typically utilized in disk drive systems, the sliders 26 cause the magnetic transducers 25 of the read/write heads 24a–h to "fly" above the surfaces of the respective storage disks 22a–d for non-contact operation of the disk drive system, as discussed above. When not in use, the voice coil motor 32 rotates the actuator arms 28a–h to position the read/write heads 24a–h over a respective landing zone 58 or 60, where the read/write heads 24a–h come to rest on the storage disk surfaces.

A printed circuit board (PCB) 34 is provided to mount control electronics for controlled operation of the spindle motor 29 and the voice coil motor 32. The PCB 34 also incudes read/write channel circuitry coupled to the read/write heads 24a–h, to control the transfer of data to and from the data tracks of the storage disks 22a–d.

Figure 2:
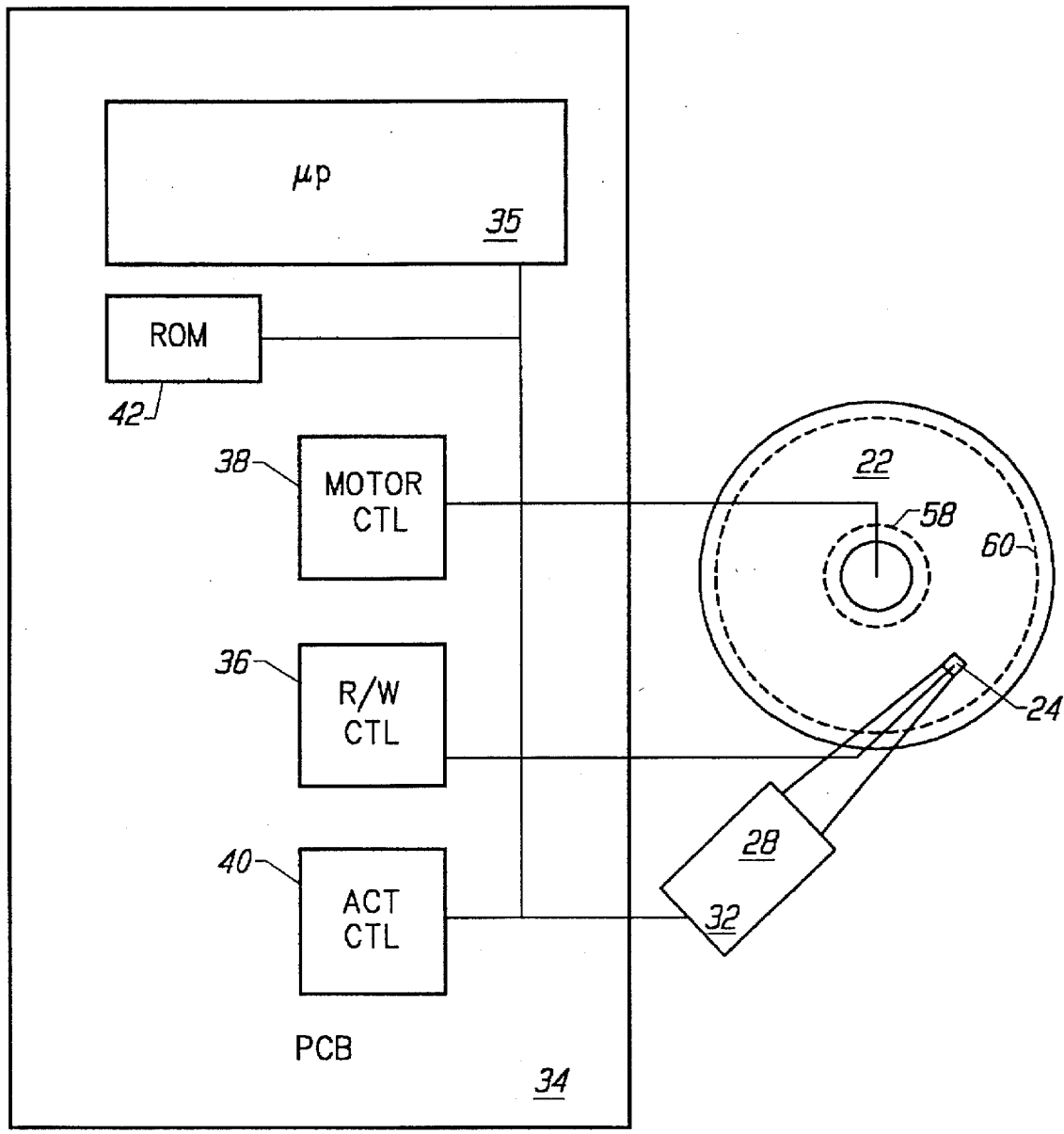
FIG. 2 is a schematic top view of the disk drive of FIG. 1.

Referring now to FIG. 2, there is illustrated in schematic form the PCB 34 and the electrical couplings between the control electronics on the PCB 34 and the components of the disk drive system described above. A microprocessor 35 is coupled to each of a read/write control 36, spindle motor control 38, actuator control 40 and ROM 42. The microprocessor 35 sends data to and receives data from the storage disks 22a–d via the read/write control 36 and the read/write heads 24a–h.

The microprocessor 35 also operates according to instructions stored in the ROM 42 to generate and transmit control signals to each of the spindle motor control 38 and the actuator control 40.

The spindle motor control 38 is responsive to the control signals received from the microprocessor 35 to generate and transmit a drive voltage to the spindle motor 29 to cause the storage disks 22a–d to rotate at an appropriate rotational velocity.

Similarly, the actuator control 40 is responsive to the control signals received from the microprocessor 35 to generate and transmit a voltage to the voice coil motor 32 to controllably rotate the read/write heads 24a–h, via the actuator arms 28a–h, to preselected radial positions over the storage disks 22a–d. The magnitude and polarity of the voltage generated by the actuator control 40, as a function of the microprocessor control signals, determines the radial direction and speed of the read/write heads 24a–h.

When data to be written or read from one of the storage disks 22a–d are stored on a data track different from the current radial position of the read/write heads 24a–h, the microprocessor 35 determines the current radial position of the read/write heads 24a–h and the radial position of the data track where the read/write heads 24a–h are to be relocated. The microprocessor then implements a seek operation wherein the control signals generated by the microprocessor 35 for the actuator control 40 cause the voice coil motor 32 to move the read/write heads 24a–h from the current data track to a destination data track at the desired radial position.

According to the present invention, the ROM 42 stores an acceleration profile that is available to the microprocessor 35 in connection with the generation of control signals for the actuator control 40 during a seek operation. The acceleration profile includes information regarding maximum velocities that a head can be accelerated during a seek. The microprocessor uses the acceleration profile to calculate velocity profiles for each particular seek operation. Each velocity profile corresponds to the radial velocities over time, from zero to a maximum velocity, and back to zero velocity, that will result in the fastest movement of the read/write heads 24a–h for a particular seek operation.

Pursuant to the present invention, the stored acceleration profile is determined as a function of the number of data tracks to be crossed during particular seeks and the radii of the current and destination data tracks of the seeks. The microprocessor 35 determines the number of tracks to be crossed in a particular seek and the starting and finishing radii of the seek. The microprocessor 35 then retrieves the acceleration profile from the ROM 42 and uses the acceleration profile to calculate a velocity profile appropriate for the seek.

Figure 3:
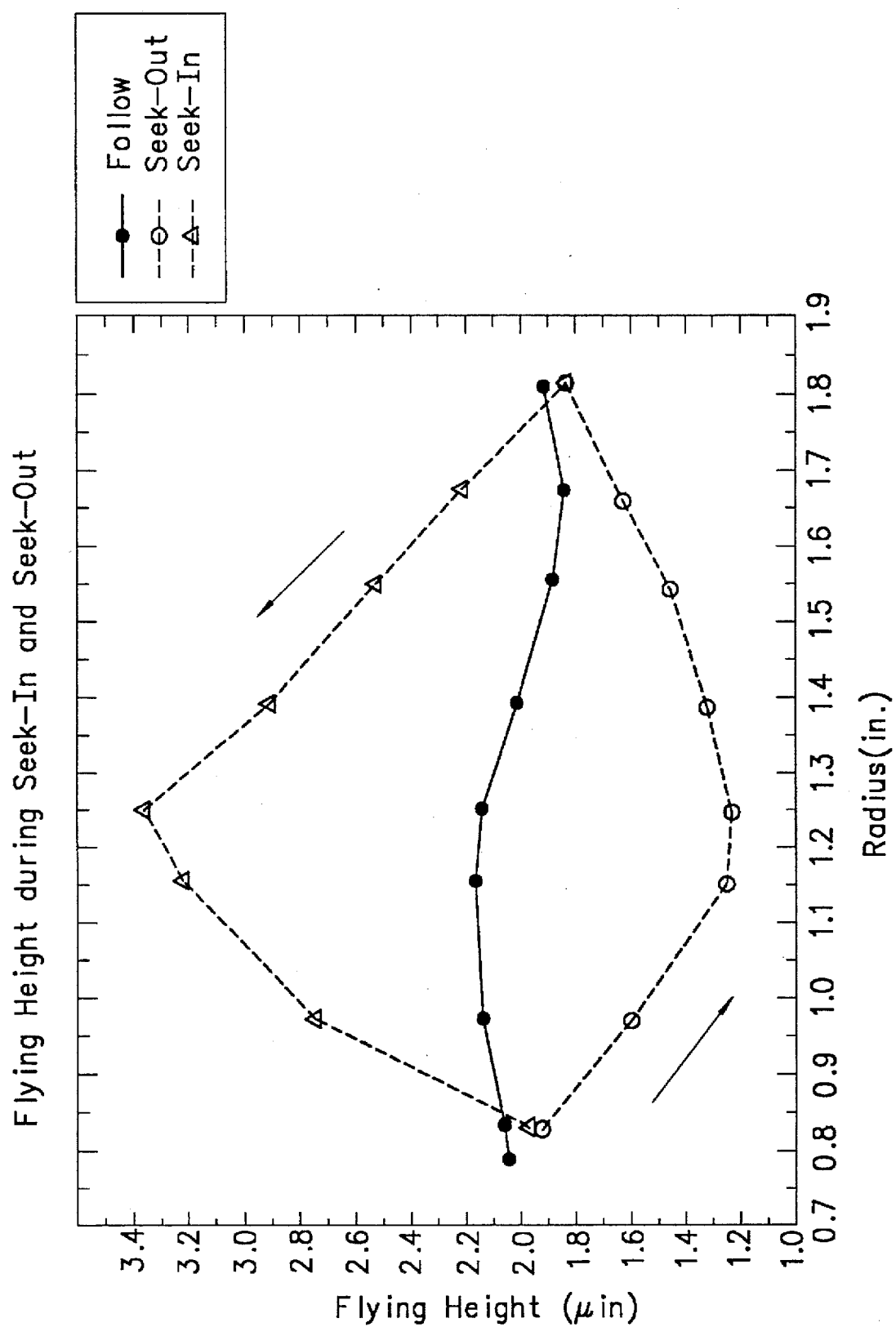
FIG. 3 is a chart showing the changes in fly height for a TPC head during each of a long seek from inner diameter to outer diameter and from outer diameter to inner diameter.

Referring now to FIG. 3, it has been observed that during a long seek from, for example, the inner diameter of a storage disk to the outer diameter of the storage disk, the fly height of the read/write head decreases from the desired fly height. In the example of FIG. 3, the desired fly height is 2.0 μ inches above the disk surface. As the read/write head moves from the inner diameter to the outer diameter, the fly height continuously decreases from 2.0 μ inches to a low of 1.2 μ inches, at the middle diameter of the storage disk, and then continuously increases back up to the 2.0 μ inch level at the outer diameter. Thus, the maximum velocity of the read/write head during a long inner diameter to outer diameter must be limited to maintain a fly height throughout the seek.

As illustrated in FIG. 3, the opposite effect occurs during a long seek from the outer diameter to the inner diameter of the storage disk, i.e., the fly height increases to a maximum over the middle diameter of the disk, at about 3.2 μ inches, and then falls again to the original fly height, at the inner diameter of the disk.

Figure 4:
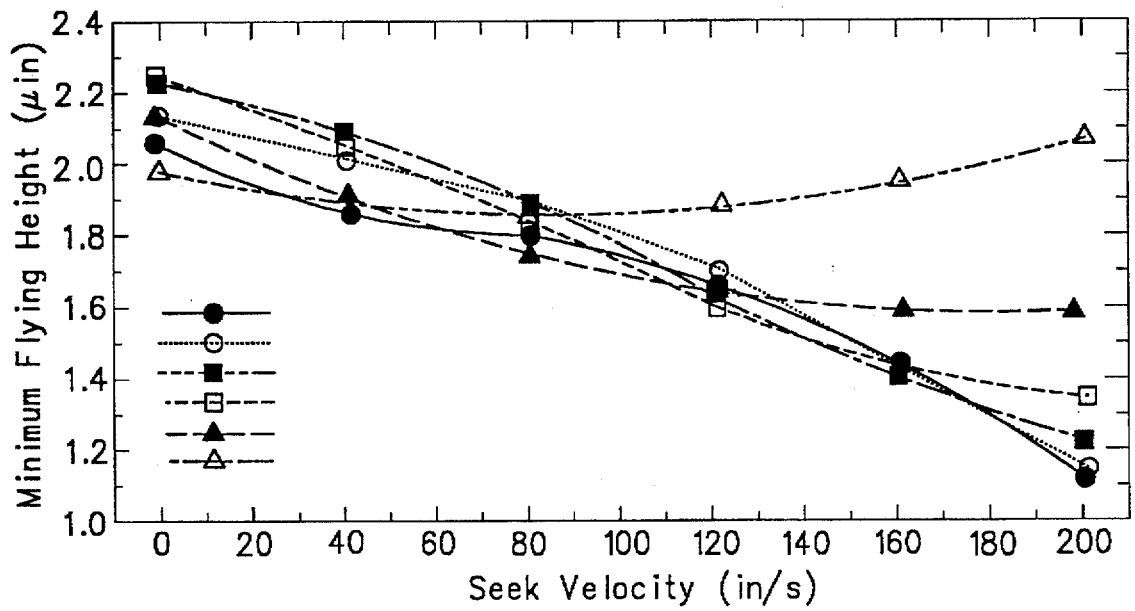
FIG. 4 is a graph plotting flying height versus seek velocity at six representative radii of a disk.

A further illustration of the fly height loss phenomenon is shown in the graph of FIG. 4. The graph of FIG. 4 plots minimum fly height in μ inches versus seek velocity in inches per second for each of several radii of the disk during a seek toward the outer diameter. From the graph it can be seen that, in general, a considerable drop in fly height occurs at radii near the middle radius of the disk for seeks from the inner diameter to the outer diameter. However, the loss in fly height is significantly less pronounced for radii at the outer diameter of the disk, and actually improves at higher seek velocities.

Figure 5:
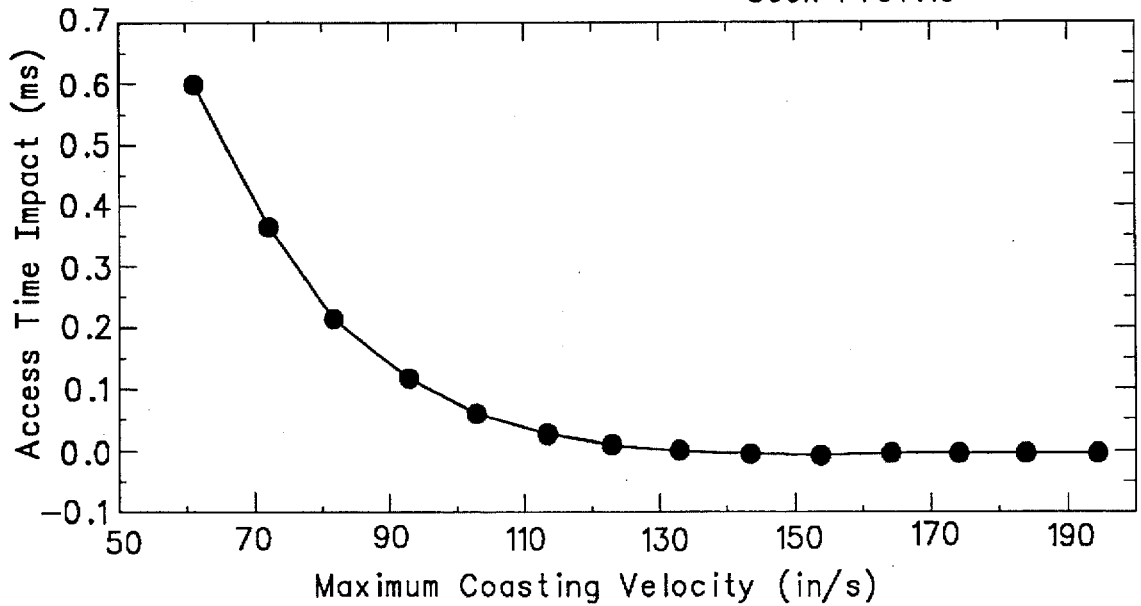
FIG. 5 is graph showing data access time as a function of maximum coasting velocity.

The present invention utilizes the observed fly height loss phenomenon to set maximum velocities in the acceleration profile values suitable for the starting and finishing radii of each particular seek. A maximum velocity as high as possible greatly reduces access time to data on the storage disks 22a–d, as clearly shown in the graph of FIG. 5.

According to the present invention, a maximum velocity for each seek is set dependent on whether the seek is toward the outer diameter or toward the inner diameter. When the seek is toward the outer diameter, a limiting maximum velocity is set for those seeks wherein the starting radius and destination radius result in a seek that traverses the region of the disk around the middle diameter of the disk.

An example of limits on maximum velocity according to the present invention is shown in FIG. 6. The example of FIG. 6 relates to a disk having an inner diameter for the innermost data track equal to 0.68 inches and an outer diameter for the outermost data track equal to 1.805 inches. The vertical column of the chart lists starting radii from 0.68 inches to 1.577 inches and the horizontal row of the chart lists destination radii of from 0.68 inches to 1.805 inches. Each row/column intersection indicates whether there is a limit to the maximum velocity, and if so, the upper limit for the maximum velocity for the corresponding combination of starting/destination radii.

As can be seen from FIG. 6, many seek operations need not be limited to an upper value for the maximum velocity due to fly height loss considerations. Indeed, only those seeks toward the outer diameter of the disk, and passing through the middle of the disk, require a limit on maximum velocity due to fly height loss. Thus, seeks involving starting and destination radii that do not circumscribe the middle radius, can be performed at maximum velocities higher than those presently used in velocity profiles. The remaining seeks are limited to a maximum velocity that is suitable, in view of the particular starting and destination radii, to maintain a fly height, even at the lowest point during the seek, at an acceptable level above the disk surface.

It has been determined that by limiting maximum velocities only when necessary, due to the passage of read/write heads through regions surrounding the middle diameter of the disk, and not limiting the maximum velocity for other seeks, including all seeks toward the inner diameter of the disk, the average velocities usable for all seeks increases.

We claim:

1. A disk drive, comprising:

a storage medium comprising a disk having an inner diameter, a middle diameter and an outer diameter;

the data tracks extend across the disk from the inner diameter to the outer diameter of the disk;

a spindle motor mounting the storage medium for rotation;

an interactive element for reading information from and writing information on the data tracks of the storage medium;

the interactive element being arranged and configured to fly above the storage medium;

an actuator responsive to control signals, mounting the interactive element for motion to selectively position the interactive element relative to preselected data tracks of the storage medium and to move the interactive element from a first data track to a second data track in response to the control signals; and control electronics coupled to the actuator for generating the control signals to cause the actuator to move the interactive element from the first data track to the second data track, the control signals including velocity control signals generated as a function of the number of data tracks to be crossed from the first data track relative to the second data track, the velocity control signals controlling the actuator to move at preselected velocities, including a first and second maximum velocity, the control electronics generating the velocity control signals with the maximum velocity being set as a function of direction of movement of the interactive element, the maximum velocity being set at a value X when such movement is in a direction from the inner diameter to the outer diameter and across the middle diameter of the disk, and with the maximum velocity being set at a value Y when said movement is in a direction from the outer diameter to the inner diameter and across the middle diameter of the disc where X<Y.

2. The disk drive of claim 1, wherein:

the storage medium comprises a disk having an inner diameter, a middle diameter and an outer diameter;

the data tracks extend across the disk from the inner diameter to the outer diameter of the disk;

the control electronics generates the velocity control signals with the maximum velocity being set as a function of movement of the interactive element when such movement is in a direction from the inner diameter to the outer diameter and across the middle diameter of the disk.

3. The disk drive of claim 1, further comprising an acceleration profile, including acceleration and velocity information corresponding to preselected numbers of tracks between first and second data tracks and preselected relative locations between first and second data tracks, and maximum velocities, each set as a function of a respective number of data tracks to be crossed and preselected relative locations of first and second data tracks;

the control electronics using the acceleration profile when generating velocity control signals.

4. The disk drive of claim 3, wherein the control electronics comprises a microprocessor operating to generate the control signals, and further comprising a memory for storing the acceleration profile.

5. The disk drive of claim 4, wherein the memory comprises a ROM.

6. The disk drive of claim 3 wherein:

the storage medium comprises a disk having an inner diameter, a middle diameter and an outer diameter;

the data tracks extend across the disk from the inner diameter to the outer diameter of the disk;

the control electronics generates the velocity control signals from the acceleration profile, with the maximum velocity being set as a function of movement of the interactive element when such movement is in a direction from the inner diameter to the outer diameter and across the middle diameter of the disk.

7. For use in a disk drive comprising a storage disk having data tracks spaced over a surface of the disc from an inner diameter past a middle diameter to an outer diameter,, a spindle motor mounting the storage disk for rotation, and an interactive element for transferring data to and from the data tracks and arranged to fly above the data tracks during a period of operation of the disk drive, a method for moving the interactive element from a first data track to a second data track, comprising the steps of:

moving the interactive element through a series of velocities from the first data track to the second data track; and controlling the velocities to have a maximum velocity set as a function of the number if data tracks to be crossed from the first data track to the second data track, and the direction of movement of said interactive element and the location of the first data track relative to the second data track being spaced from each other at opposite sides of said middle diameter of said disk, the interactive element being limited to moving at a first velocity X when moving in a direction toward said outer diameter and away from said inner diameter, and limiting said movement said interactive element to a second velocity Y when moving in a direction away from said outer diameter toward said inner diameter where X<Y.

8. A method for performing seek operations in a disk drive, comprising the steps of:

for each seek operation, determining the radius and number of a first data track, and the radius and number of a second data track;

moving an interactive element from the first data track to the second data track through a series of velocities, including a maximum velocity; and setting the maximum velocity to a value determined as a function of a number of tracks between the first and second data tracks and the radii of the first and second data tracks and whether the first and second data tracks are on opposite sides of a middle radius of said disc said maximum velocity being limited to a first value X when said seek operation is away from an inner radius of said disc and toward an outer radius of said disc and crosses a track at said middle radius, and being limited to a second value when said seek operation is away from said outer diameter and toward said inner diameter and crosses said track at said middle radius where X<Y.

* * * * *